Aug. 29, 1967  E. V. GILBERT  3,338,499
DEVICE FOR WELDING PIPE ENDS
Filed June 25, 1964
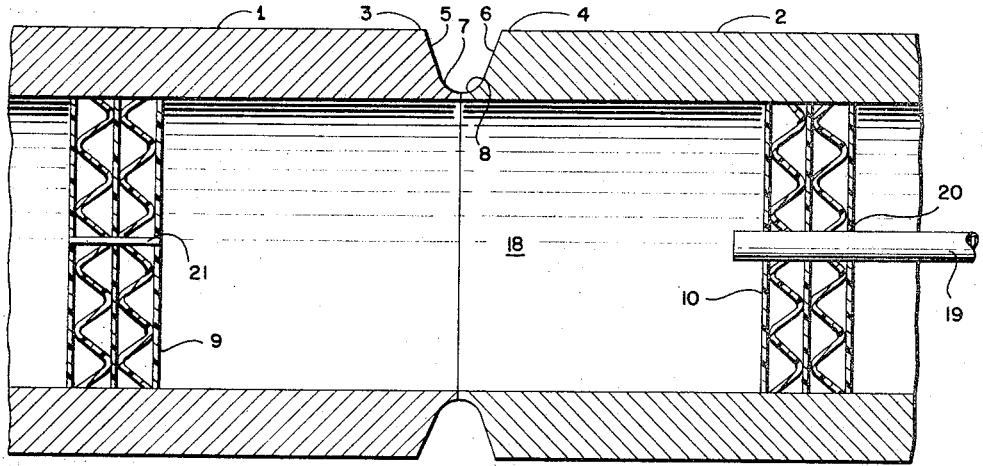
FIG. 1
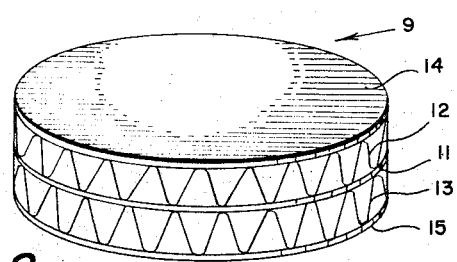
FIG. 2
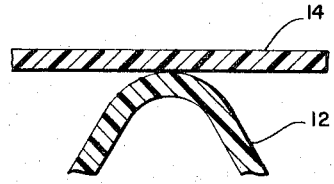
FIG. 3
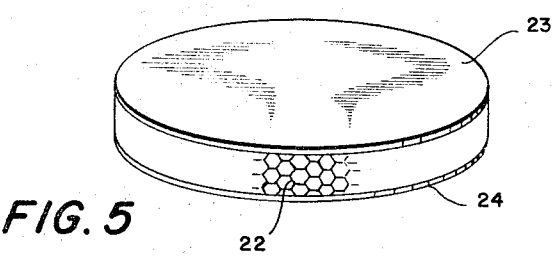
FIG. 5
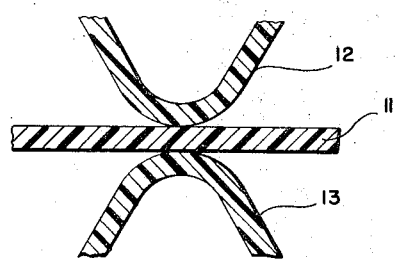
FIG. 4
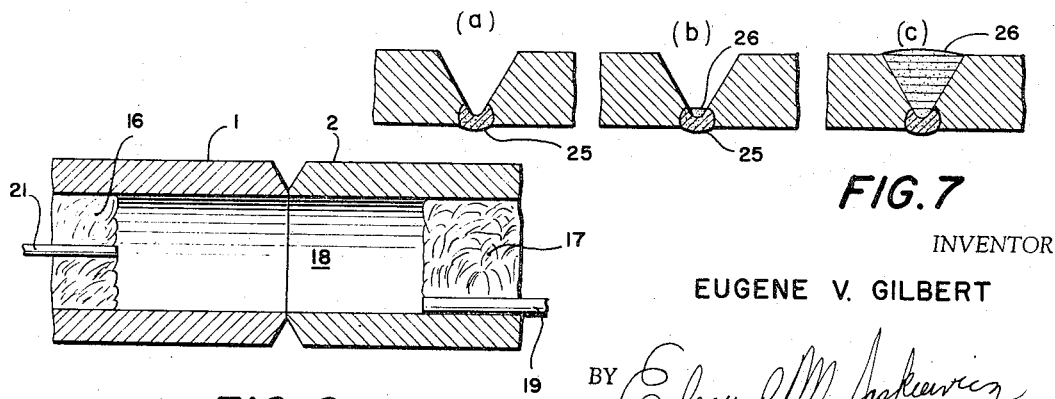
FIG. 6
FIG. 7
INVENTOR
EUGENE V. GILBERT
BY *Edmund M. Jaskiewicz*
ATTORNEY

United States Patent Office 3,338,499
Patented Aug. 29, 1967

3,338,499
DEVICE FOR WELDING PIPE ENDS
Eugene V. Gilbert, Miamisburg, Ohio, assignor of one-third to Edmund M. Jaskiewicz, Washington, D.C.
Filed June 25, 1964, Ser. No. 377,876
4 Claims. (Cl. 228—57)

The present invention relates to the welding of pipe ends one to the other, more particularly, to the welding of stainless steel pipe ends and to a water soluble device for forming a chamber with the adjoining pipe ends into which an inert gas is introduced. After welding is completed, the devices are dissolved by flowing water through the welded pipes.

When butt welding stainless steel pipe, the welding process must produce optimum qualities at the welded joints since the welded pipe may be subjected to extremely severe and demanding service conditions, such as under conditions conducive to corrosion, high rates of flow of fluids through the pipe, contact with materials which may be radioactive, and high rates of heat transfer with sudden changes at high temperatures. Conventional welding processes will not produce the quality of joints required to meet these exacting requirements.

When welding pipe ends together, as well as other metal structural shapes, it is of prime importance that the inner portions of the joint are well formed and free from undesirable imperfections. Heavier walled pipes are usually beveled about the edges to be joined so that when the edges are brought together they form an annular V-shaped groove extending to a point spaced from the inside of the pipe in order to form a thin root portion. The strength and durability of the weld in this root portion in a large part determines the strength and quality of the completed weld. The V-groove at the joint is also used for other metal shapes.

A particular problem arises when welding together austenitic stainless steel pipe since this material cannot be exposed to the atmosphere while it is at the elevated temperatures encountered during welding. Accordingly, an inert gas is used to shield the weld area in order to compensate for the time-temperature factor.

However, in stainless steel pipe, the greatest single cause of defective welds is improper shielding of the interior surface of the pipes at the weld area. Thus, many fixtures, plugs, seals and the like have been devised to seal the pipes in order to retain the gas backing or to enable the inner wall of the pipe to be purged during the welding operation. Many of the fixtures devised have been complicated and expensive to fabricate in order to obtain a satisfactory gas seal. The plugs and seals which have been used to control the size of the inner area of the pipes which are to be purged with inert gas were limited to use only in those instances where it was possible to remove them after completing the welding operation.

Even though inert gas backing for welds has proved to be a desirable procedure, particularly in stainless steel pipes, the problems encountered in field and shop applications such as in removal of the plugs or seals have prevented its general use.

It is therefore the principal object of the present invention to provide a novel and improved process for the welding together of stainless steel pipe.

It is another object of the present invention to provide a novel and improved arrangement for forming a gas backing chamber in the vicinity of the pipe ends which are to be welded.

It is a further object of the present invention to provide a water soluble pipe plug or seal.

The objects of this invention are attained and the disadvantages of the prior art are eliminated by the welding process disclosed herein. In the process, water soluble plastic plugs or seals are fitted into each pipe at a point spaced from the ends to be welded to seal the pipes. The pipes are then held in abutting relationship so a chamber is formed in the pipes by the plugs and the intervening pipe end portions. A small hose is then snaked through the pipe to supply an inert gas to the chamber, to provide a gas backing for the joint to be welded. A vent is provided in the chamber to vent the gas therefrom so that the gas purges the chamber. The pipes are then welded together while the gas is in the chamber. After completing the welding the hose is removed and the weld can be inspected in any prescribed manner without any though being given to the plastic plugs. When the piping system is given a hydrostatic test, the plastic pipe plugs will simply dissolve. If a hydrostatic test is not required, then cold water can be flushed through the welded pipes to dissolve the plugs.

The plugs can be merely wads of water soluble plastic sheet material or may have a corrugated or honeycomb structure with circular disks on both sides of the structure.

Other objects and advantages of the present invention will be apparent upon reference to the accompanying description when taken in conjunction with the following drawings, wherein;

FIGURE 1 is a longitudinal sectional view of the pipe ends which are to be welded together and in abutting relationship;

FIGURE 2 is an overall perspective view of a pipe plug of the present invention having a corrugated center section;

FIGURES 3 and 4 are sectional views in enlarged scale of connections between the discs and corrugated sections of the plug of FIGURE 2;

FIGURE 5 is a view similar to that of FIGURE 2 but with the plug having a honeycomb center section;

FIGURE 6 is a sectional view as in FIGURE 1 and showing wads of sheet material used as plugs in smaller diameter pipes; and FIGURES 7(a-c) are cross sectional views of a weld showing successive steps in joining the pipe ends.

Returning now to the drawings, wherein like reference symbols indicate the same parts throughout the various views, there is shown in FIGURE 1 end sections 1 and 2 of two lengths of stainless steel pipe that are to be butt welded according to this invention. The ends 3 and 4 of the pipes are preferably prepared for welding by beveling the outer edges at 5 and 6 to form a V-shaped annular groove 7 when the pipe sections are brought into abutting relationship. The groove 7 may have a rounded base section 8. The pipe sections 1 and 2 are retained in the abutting relationship and in alignment by any suitable means, such as by tack welded brackets, jigs, or the like.

In each pipe section at points spaced from the ends thereof, there are snugly fitted plugs or seals 9 and 10 which are fabricated from water soluble synthetic plastic material. The seals are similar and plug 9 comprises a central circular disk 11 both sides of which have adhered thereto circular corrugated members 12 and 13. End circular disks 14 and 15 are then adhered to the corrugated members to form a cylindrical plug. The diameter of the plug is such that the plug fits closely within the pipe section so as to seal the pipe.

The plastic material from which the plugs 9 and 10 are fabricated is a translucent water soluble film which exhibits good tear and impact strength at normal temperatures. Such a plastic is manufactured by the Dow Chemiical Company and is designated as experimental plastic QX–4281.3. This plastic is heat sealable within a range of 125°–135° F. The plastic is soluble in a broad range of water temperatures from 30–210° F. The solubility rate of a 1.75 mil film of this plastic ranges from 12.5 seconds at 30° F. to about 3.0 seconds at 110° F. Increasing the thickness of the film would not affect the water solubility of the film but the rate of solubility would be correspondingly slowed. Also, there is some slowdown in the rate of solubility in film that has been heat sealed. For example, the dissolving time of heat sealed ten 2 mil sheets for a total thickness of 20 mils would be approximately 4 minutes. For ten water sealed 2 mil sheets would be approximately 4 minutes, and for five water sealed 2 mil sheets would be approximately 3 minutes.

The thickness of the sheet material used to fabricate a plug would depend on the diameter of the plug and would be sufficient to at least sustain its own weight. Such a sheet may range from 10–20 mils in thickness. These fabricated plugs or seals would be required for pipes having sizes greater than 2 inches. Pipes smaller than 2 inches can be sealed as shown in FIGURE 6 wherein sheet material is merely stuffed in the pipes to form wads 16 and 17.

In FIGURE 1 the plugs 9 and 10 together with the intervening portions of the pipe sections form a chamber 18. A small hose 19 is passed through an opening 20 in the plug 10 and connected to a source of inert gas, such as argon, nitrogen or helium. The plug 9 is provided with a vent hole 21 to vent the purging gas from the chamber 18.

The plugs may be of the form illustrated in FIGURE 5 wherein a central section 22 is of a honeycomb construction with end disks 23 and 24 being adhered (by heat or water sealing) on both sides of the honeycomb section. Other structural forms for the plugs may be employed. The primary factor influencing the construction of the plug is the overall diameter of the plug since the structure of the plug must be such to give the plug sufficient rigidity. It is not necessary that the plugs withstand high pressures since there is pressure within the chamber which is of the order of 1 ounce per square inch—the inert gas serves to purge the chamber and maintaining a pressure in the chamber higher than atmospheric is not necessary in this process.

In carrying out the process of this invention, the end portions of the pipes to be welded are sealed by water soluble plastic plugs or wads to form a chamber extending over the adjoining ends of the pipes. To prevent melting of the plastic during the welding operation, the plugs are either positioned sufficiently distant from the ends to be welded or the pipe is cooled with a suitable coolant, i.e. water, air, Dry Ice or the like. Since stainless steel does not become dissipate heat as rapidly as mild steel, heat control becomes less of a problem.

The pipes are then held in abutting relationship and alignment by any suitable apparatus such as, for example, clamps or brackets which bridge the V-shaped groove at several places and are tack welded to the outer surface of the pipes. The size and thickness of such brackets is largely determined by the diameter and weight of the pipes and should be heavy enough to hold the pipes in firm abutting relationship.

With the pipes held in position to be welded, a small hose is snaked through the pipe and inserted through an opening in one plug. Where the pipe sections are of great length, it may be preferable to insert the hose into the plastic plug prior to securing both pipes in the welding position. A vent hole is provided in the other plug. A purging or inert gas, such as argon, nitrogen, argon-helium mixtures and the like is then fed into the chamber 18 through the hose. The presence of the vent hole enables the inert gas to purge the chamber so that an inert gas backing is provided for the joint to be welded. The pressure within the chamber is atmospheric or of the order of only several ounces per square inch to avoid the possibility of blowing out the plastic plugs.

The pipe sections are then welded together by first welding the root by an electric arc. During this welding, the abutting edges become firmly united as illustrated by the cross-hatching in FIGURE 7a. This weld will produce a bead 25 which extends only slightly into the pipe. After completion of the root weld, successive beads of filler metal 26 are applied as shown in FIGURE 7b. These beads should completely cover the root and be firmly bonded to the root as well as to the side walls of the V-shaped groove. During the welding of the root and the application of the first bead of filler metal, the chamber within the pipe ends is purged with the inert gas. As a result, the inner surfaces of the pipes and weld are protected and remain in excellent condition. The filler metal is applied until the V-shaped groove is completely filled as shown in FIGURE 7c.

After welding, the weld and adjacent portions of the pipes may be heated in order to stress relieve the weld and pipes.

The weld may be inspected in any prescribed manner without being concerned with the plugs.

The plastic plugs are then removed by dissolving them in cold or room temperature water. If the welded pipes are a part of a system which is to be given a hydrostatic test, then the plastic plugs will simply dissolve during this test. Otherwise, the pipes are flushed with available water to dissolve the plugs. There is no need to heat or otherwise treat the water to be used in dissolving the plastic plugs. Dissolution of the plugs produces no residue since the plugs are completely dissolved.

Thus, the plastic plugs are readily and completely removed regardless of valves in the piping system, abrupt changes in direction of the pipes, reductions in pipe diameter, or there are long distances (over 20 feet) from the welded joint to the nearest entrance to the pipe. Thus, long lengths of pipes (100 feet or more) welded together according to this process present no problems in removing of the plastic plugs after welding of the joint is completed.

While the several figures of the drawing illustrate the welds as being accomplished in essentially a horizontal plane, it is apparent, that welds can be carried out in any plane extending from the horizontal to the vertical.

Thus, it can be seen that the present invention provides an effective arrangement for a gas backing chamber in the welding together of stainless steel pipe ends where the chamber is quickly eliminated after welding without the necessity for gaining access to the interior of the welded joint. The dissolution of the plugs forming the chamber is readily carried out with available water and no trace remains of the dissolved plugs. Although this invention has been described in connection with the welding of stainless steel pipes, it is apparent that the invention is applicable to other metallic shapes, particularly where the front side only of the joint to be welded is accessible to the welder.

It will be understood that this invention is susceptible to modification in order to adapt it to different usages and conditions, and accordingly, it is desired to comprehend such modifications within this invention as may fall within the scope of the appended claims.

What is claimed is:

1. A pipe plug comprising a pair of spaced circular disks of water soluble plastic sheet material, and a circular member of corrugated water soluble plastic sheet material interconnecting said spaced disks, the diameters of said disks and circular member being equal to define a cylindrical plug.

2. A pipe plug comprising a pair of spaced similar plates of water soluble plastic sheet material, a corrugated member of water soluble plastic sheet material adhered to the opposing faces of said spaced plates, the outlines of said plates and corrugated member conforming to the internal cross-section of a pipe so as to fit therein.

3. A pipe plug comprising a center plate of water soluble plastic material, first and second corrugated members of water soluble material adhered to the faces of said center plate, a pair of outer plates similar to said center plate and adhered to said first and second corrugated members, the outlines of said plates and corrugated members conforming to the internal cross-section of a pipe so as to fit therein.

4. A pipe plug comprising a pair of spaced similar plates of water soluble plastic sheet material, and a honeycomb member of water soluble material adhered to the opposing faces of said plates to interconnect the same, the passages in said honeycomb member extending perpendicularly to said plates, the outlines of said plates and honeycomb member conforming to the internal cross-section of a pipe so as to fit therein.

References Cited
UNITED STATES PATENTS

| | | | |
|---|---|---|---|
| 1,990,077 | 2/1935 | Kershaw | 29—491 |
| 2,819,517 | 1/1958 | Pursell | 29—483 |
| 3,095,844 | 7/1963 | Thielsch | 29—493 |
| 3,110,103 | 11/1963 | Davey | 29—491 |

JOHN F. CAMPBELL, *Primary Examiner.*

CHARLIE T. MOON, *Examiner.*

L. J. WESTFALL, *Assistant Examiner.*